July 7, 1931. S. M. WRIGHT ET AL 1,813,722
FISH LURE AND PROCESS OF MAKING THE SAME
Filed Dec. 14, 1928
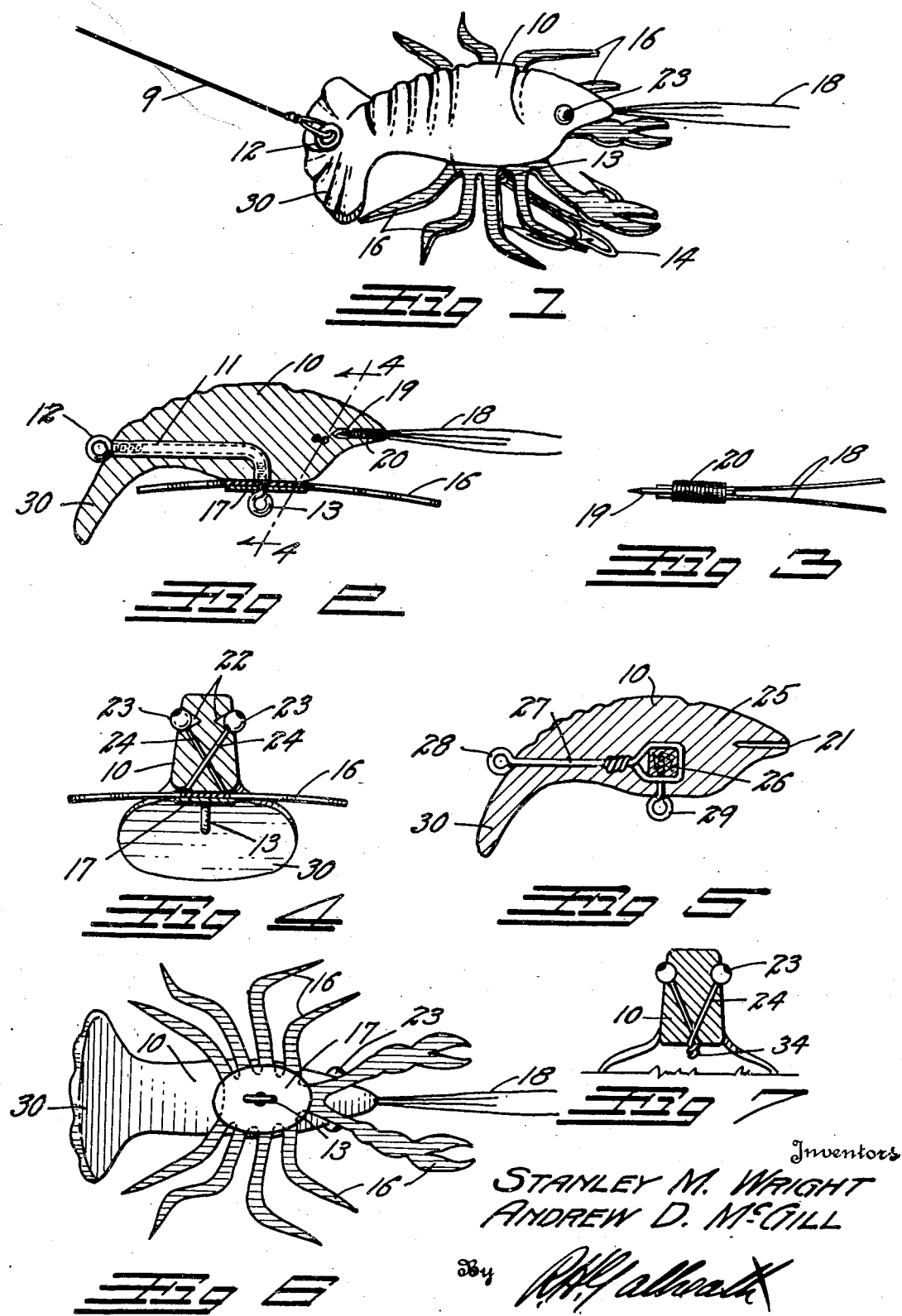
Inventors
STANLEY M. WRIGHT
ANDREW D. McGILL
By R. H. Galbraith
Attorney Patented July 7, 1931

1,813,722

UNITED STATES PATENT OFFICE

STANLEY M. WRIGHT AND ANDREW D. McGILL, OF DENVER, COLORADO

FISH LURE AND PROCESS OF MAKING THE SAME

Application filed December 14, 1928. Serial No. 326,022.

This invention relates to the construction of fishing lures, more particularly to the type of lure having a body formed to simulate a minnow, crab, lobster, etc. The principal object of the invention is to provide a construction which will allow the body of the lure to be cast or molded from a material having relatively high specific gravity and a low tensile strength without impairing the strength of the lure.

Another object of the invention is to provide a unique method for applying legs or other appurtenances to the body.

Still another object of the invention resides in the method employed for attaching the tentacles.

A further object of the invention is to provide an efficient method for attaching the eyes to the body of the lure.

A still further object is to so shape the lure that it will have a downwardly projecting, flaring surface, integrally formed with the body, which will act, when the lure is drawn through the water, to submerge it below the surface thereof.

Other objects and advantages reside in the detail construction of the invention, which is designed for simplicity, economy, and efficiency. These will become more apparent from the following description.

In the following detailed description of the invention reference is had to the accompanying drawings which forms a part hereof. Like numerals refer to like parts in all views of the drawings and throughout the description.

In the drawings:

Fig. 1 is a perspective view illustrating one form of lure embodying the invention.

Fig. 2 is a longitudinal vertical section therethrough.

Fig. 3 is a detail magnified view illustrating the method of preparing the tentacles for attachment.

Fig. 4 is a diagonal section taken on the line 4—4, Fig. 2, illustrating the method of attaching the eyeballs.

Fig. 5 is a longitudinal vertical section through an alternate form of the invention.

Fig. 6 is a bottom plan view of the lure of Fig. 1.

Fig. 7 illustrates an alternate method for attaching the eyeballs.

Lures of this type are usually carved from a solid block of wood requiring great skill and tedious hand labor, necessitating a relatively high, and in most cases, prohibitive price. Attempts have been made to mold the bodies of various plastic substances such as plastic wood, papier-mâché, fibrous compositions, etc. But these attempts have not been successful because molded materials having a high specific gravity do not have the requisite tensile strength to resist the strain imposed between the hook and the line. The molded materials also will not hold the screw eyes necessary for the attachment of the hooks and line.

In the present invention, however, the body can be molded from any desired material, plastic wood being preferable, since the strain between the line and the hooks is not in any way applied to the body.

The invention comprises a body 10 molded from any suitable material about a metallic tube 11. The extremities of the tube 11 are threaded to receive a screw eye 12 for attaching the line to the lure, and a second screw eye 13 for attaching the hooks, such as illustrated at 14, thereto. The tube 11 is bent downwardly within the body of the lure so that the screw eye 13 will project from the bottom thereof.

It is preferred to employ a tube at this point for several reasons; first, a tube requires only the standard type of bent wire eyelet; second, the tube defines the eyelet openings in the body so that the body can be formed up to the tube so as to prevent water from entering the body along the tube; third, the tube being hollow forms an air chamber within the body 10 which increases the buoyancy thereof.

It will be seen by the use of this construction that the tube 11 acts as a metallic tension member to transmit the pull or tension of the line. As a fish is hooked upon the hooks 14 and a strain imparted to the fish line, this strain will be carried through the body 10 by the tube 11 without imparting any destructive tension to the body.

In some forms of lures such as illustrated in Fig. 1 it is desirable to have imitation legs or claws 16 project from the body. The legs 16 are cut from the edges of a flat sheet 31 of rubber or similar flexible material so that they are all permanently attached together. They are secured to the body 10 by placing the sheet 31 against the bottom thereof and covering the midportion of the sheet by a suitably shaped metallic disc 17. The screw eye 13 is then passed through the disc 17 and the sheet 31 into the extremity of the tube 11 where it is tightly screwed in place. Thus the screw eye 13 serves a double purpose; first, it carries the hooks 14 and, second, it serves to attach the legs or claws 16 to the body.

Certain lures such as the one illustrated in Fig. 1 require tentacles 18 to project therefrom. Heretofore it has been practically impossible to attach these tentacles to the body 10 especially when the body is formed of a molded material. In the present invention the tentacles 18 are placed along an attachment pin 19 and are wrapped securely thereon by means of a thread 20. The pin 19 and the thread 20 can then be molded into the body 10 at the time it is formed, or if desired a small hole 21 can be drilled or cored into the body so that the pin 19 with its wound thread 20 can be forced tightly into the hole. When the body receives its final coat of lacquer or varnish the hole 21 will be closed over the pin 19 so that the tentacles 18 will be permanently attached in place.

In Fig. 4, a method for attaching the eyeballs of the lure to the body 10 is illustrated. In carrying out this method two conical eyeball sockets 22 are molded in the sides of the lure. The eyeballs, illustrated at 23, are provided with pins 24, upon which they are permanently molded. Small holes are drilled from the sockets 22 downwardly and rearwardly in the body 10, into which the pins 24 are forced. In placing the pins in place they will be flexed slightly as the eyeballs 23 pass the edges of the sockets 22 and the eyeballs will then snap into position within the sockets 22 making it impossible for the pins 24 to be thereafter withdrawn, thus acting to permanently lock the eyes in place.

In Fig. 5 we have illustrated an alternate method of reinforcing the body of the lure and attaching the line and hook eyes thereto. In this form of the invention a body 25 having any desired design or outline is molded about a wooden block 26 preferably of a relatively hard wood. A wire 27 is attached to the block before it is placed in position within the body. This wire carries at its extremity a loop 28 to which the fish line 9 is attached. The hooks can be attached to the body by means of a similar wire or can be attached thereto by means of a screw eye 29 screwed into the wooden block 26. By this construction the body 25 is relieved from any strain or threaded attachment to the line or hooks, so that any desired material can be used for molding the body.

It is desired to call attention to the fact that the body 10 is widely flared and turned downwardly to form a tail 30 which forms a baffle or rudder. The tail 30 is acted against by the water as the lure is drawn therethrough to force the lure downwardly below the water surface until a point of equilibrium is reached between the action of the tail 30 and the pull of the line 9. The lure will then travel at a set horizontal level below the surface.

The lure is given a side to side wavering action by having the tail wider than the body so that it will project beyond the sides thereof. This causes the water to exert a side pressure on the lure which causes it to follow the line with a wavering motion imitating the swimming action of a live lure.

In Fig. 7 an alternate method of securing the eyeballs in place is illustrated. In this method the two eyeball wires 24 are twisted together below the body of the lure as illustrated at 34. This forms a positive lock for the eyeballs regardless of shrinkage or damage to the body of the lure. The twisted wire will be covered by the finishing coats of lacquer or varnish so that they will be protected from corrosion.

The quality of the lure has been enhanced to an unexpected degree by the use of plastic wood for the body and lacquer for the finishing coat. Heretofore it has been impossible to prevent the finish coat from flaking away under the action of the water. By the use of what is commercially known as plastic wood and lacquer we have entirely obviated this difficulty.

Plastic wood is a composition of wood pulp and amyl acetate or bronzing liquid—lacquer is composed of amyl acetate and nitro cellulose. Thus when lacquer is applied as a surface coating to plastic wood the acetate of the lacquer dissolves the surface of the plastic wood and causes an inseparable composition of wood pulp, amyl acetate and nitro cellulose.

While a specific form of the improvement has been described and illustrated herein it is desired to be understood that the same may be varied within the scope of the appended claims without departing from the spirit of the invention.

Having thus described the invention, what I claim and desire secured by Letters Patent is:—

1. A fishing lure comprising: a metallic tension member; a body molded about said tension member; a sheet of flexible material having an outline simulating legs or the like; a plate of rigid material; and a screw eye adapted to thread to said tension member and cause said plate to clamp said sheet against said body.

2. A fishing lure comprising: a metallic tension member; a body molded about said tension member; a sheet of flexible material having an outline simulating legs or the like; a plate of rigid material; a screw eye adapted to thread to said tension member and cause said plate to clamp said sheet against said body; and a second screw eye threaded to the other extremity of said tension member and arranged for attachment to a fishing line.

3. Means for attaching tentacles to the body of a fishing lure comprising: a pin; means for securing said tentacles to said pin, said pin and said means adapted to be carried in an opening in said body.

4. Means for attaching tentacles to the body of a fishing lure comprising: a pin; a wrapping securing said tentacles to said pin; and an opening in said body adapted to receive said pin and said wrapping.

5. A fishing lure comprising: a metallic tension member; a body molded about said tension member; a sheet of flexible material having an outline simulating legs or the like; a plate of rigid material; and means co-operating with said tension member to cause said plate to clamp said sheet against said body.

6. A fishing lure comprising: a metallic tension member; a body molded about said tension member; a sheet of flexible material having an outline simulating legs or the like; a plate of rigid material; and clamping means arranged to clamp said sheet between said plate and said body.

In testimony whereof, we affix our signatures.

STANLEY M. WRIGHT.
ANDREW D. McGILL.